US006854312B2

(12) United States Patent
Lalibertéet al.

(10) Patent No.: US 6,854,312 B2
(45) Date of Patent: Feb. 15, 2005

(54) PROCESS AND APPARATUS FOR MANUFACTURING LITHIUM OR LITHIUM ALLOY THIN SHEETS FOR ELECTROCHEMICAL CELLS

(75) Inventors: Richard Laliberté, Ste-Julie (CA); Jonathan Dubé, Laprairie (CA)

(73) Assignee: Avestor Limited Partnership, Boucherville (CA)

( * ) Notice: Subject to any disclaimer, the term of this patent is extended or adjusted under 35 U.S.C. 154(b) by 144 days.

(21) Appl. No.: 10/172,020

(22) Filed: Jun. 17, 2002

(65) Prior Publication Data

US 2003/0232246 A1 Dec. 18, 2003

(51) Int. Cl.[7] .............................................. B21C 23/00
(52) U.S. Cl. ........................ 72/253.1; 72/256; 72/270; 72/271
(58) Field of Search ............................... 72/253.1, 256, 72/257, 260, 270, 271, 272, 273

(56) References Cited

U.S. PATENT DOCUMENTS

| | | | |
|---|---|---|---|
| 4,439,125 A | | 3/1984 | Dieckmann et al. |
| 4,499,708 A | * | 2/1985 | Lewandowski et al. ........ 53/432 |
| 4,598,567 A | * | 7/1986 | Backus ......................... 72/262 |
| 5,022,252 A | * | 6/1991 | Wellman et al. ............... 72/260 |
| 5,151,136 A | | 9/1992 | Witters et al. |
| 5,167,918 A | | 12/1992 | Shin et al. |
| 5,311,761 A | * | 5/1994 | Robbins ....................... 72/273 |
| 5,318,600 A | | 6/1994 | Schlaikjer et al. |
| 5,392,628 A | * | 2/1995 | Cristiani ..................... 72/253.1 |
| 5,490,408 A | * | 2/1996 | Ando et al. ................... 72/256 |
| 5,974,850 A | * | 11/1999 | Huang et al. .................. 72/271 |
| 5,989,466 A | * | 11/1999 | Kato et al. ................. 264/40.5 |
| 6,099,290 A | | 8/2000 | Gross |
| 6,113,711 A | | 9/2000 | Armanie et al. |
| 6,517,590 B1 | * | 2/2003 | Gauthier et al. ........... 29/623.1 |

* cited by examiner

Primary Examiner—Ed Tolan

(57) ABSTRACT

A method of manufacturing lithium or lithium alloy anodes for electrochemical cells by an extrusion process wherein a lithium or lithium alloy ingot is formed into a thin sheet. The method is adapted to extrude thin sheet having a width exceeding the diameter of the lithium or lithium alloy ingot and enables the extrusion of lithium or lithium alloy thin sheets with more than one lithium or lithium alloy ingot. The invention also provides a die assembly adapted to allow adjustment and fine tuning of a die aperture while the extrusion process of a lithium or lithium alloy ingot is being carried out.

8 Claims, 4 Drawing Sheets

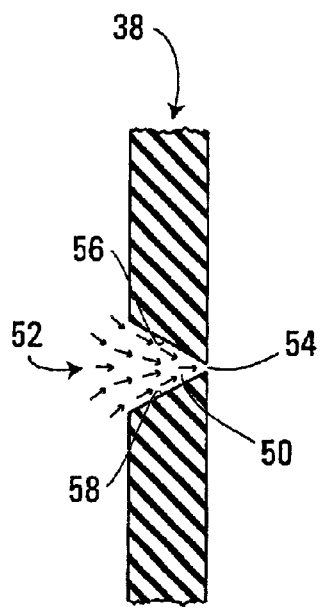
Fig. 2
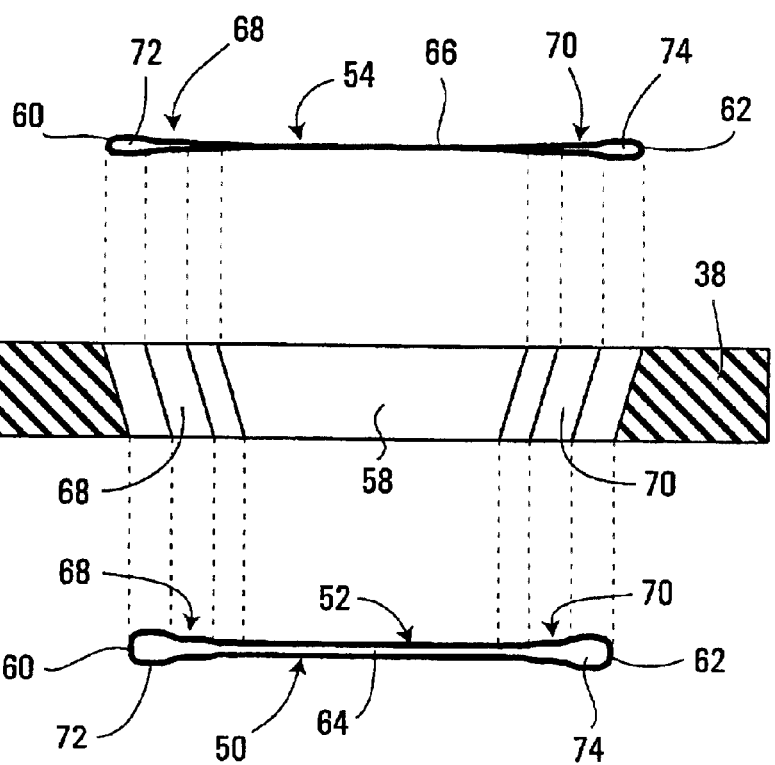
Fig. 2c
Fig. 2a
Fig. 2b

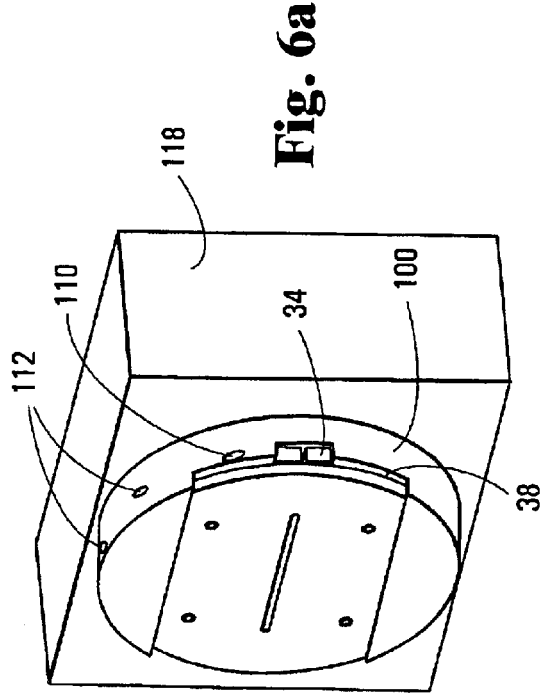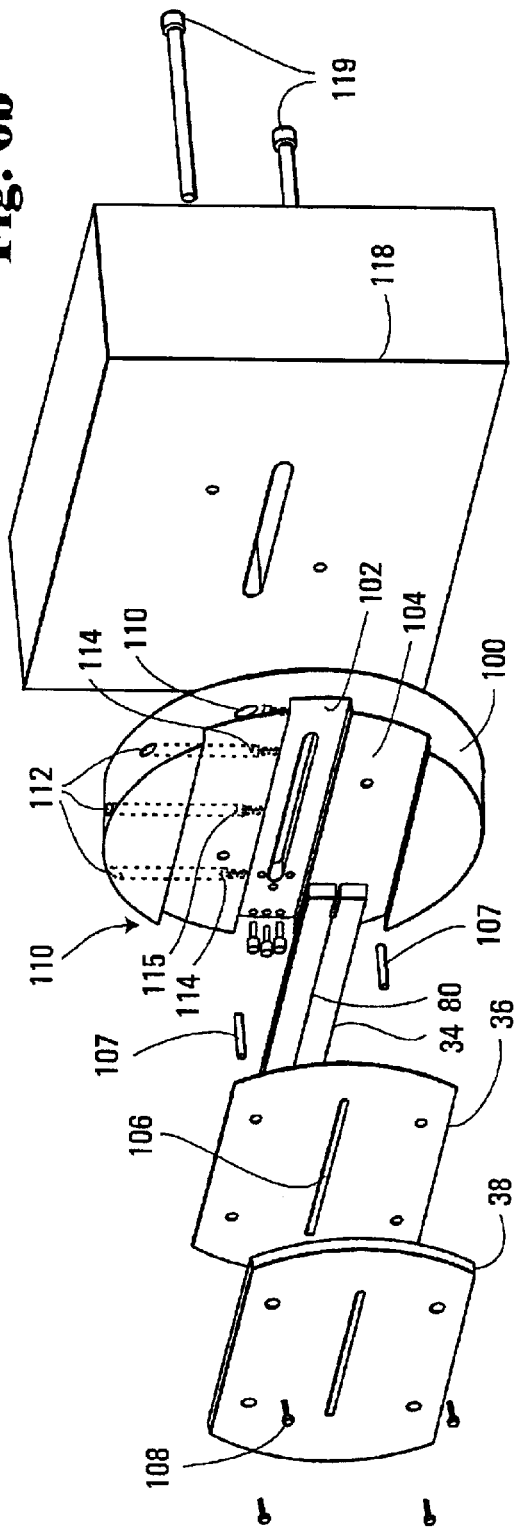

PROCESS AND APPARATUS FOR MANUFACTURING LITHIUM OR LITHIUM ALLOY THIN SHEETS FOR ELECTROCHEMICAL CELLS

FIELD OF THE INVENTION

The present invention generally relates to lithium metal polymer batteries and, more specifically, to a process for producing the lithium or lithium alloy anode components of electrochemical (EC) cells. The invention also concerns an apparatus for producing the lithium/lithium alloy anode components.

BACKGROUND OF THE INVENTION

Rechargeable batteries, which are manufactured from laminates of solid polymer electrolytes interposed between sheet-like electrodes, display many advantages over conventional liquid electrolyte batteries. These advantages typically include: lower overall battery weight; higher power density; higher specific energy; and longer service life. In addition, such batteries are also more environmentally friendly since the danger of spilling toxic liquid into the environment is eliminated.

EC cells generally include the following components: positive electrodes; negative electrodes; and an insulating material capable of permitting ionic conductivity, such as a solid polymer electrolyte, sandwiched between the electrodes. The negative electrodes, which are commonly referred to as anodes, are usually made of light-weight metallic foils, such as alkali metals and alloys, typically lithium metal, lithium-aluminum alloys and the like. The positive electrodes, which are commonly referred to as cathodes, are usually formed of a composite mixture of: an active material such as a transitional metal oxide; an electrically conductive filler, usually carbon particles; an ionically conductive polymer electrolyte material; and a current collecting element, usually a thin sheet of aluminum. Composite cathode thin films are usually obtained by coating the composite mixture onto a current collector.

Since solid polymer electrolytes are less conductive than liquid polymer electrolytes, solid or dry EC cells must be prepared from very thin films (e.g. total thickness of approximately 50 to 250 microns) to compensate the lower conductivity with a high film contact surface, thereby providing electrochemical cells with high power density. Each component of the EC cells must therefore be produced into very thin films of about 5 to 125 microns each.

Pure solid lithium, or solid lithium having a small percentage of alloy metals, is so ductile that it can be easily cut and worked at room temperature. The production of the lithium metal thin film is usually made by an extrusion process wherein an ingot of lithium/lithium alloy is inserted into a cylinder and pressed or pushed by an extrusion stem through a die aperture of the desired shape and thickness. The lithium/lithium alloy flows through a flow die of progressively narrowing cross-sectional area, thereby gradually shaping the metal flow toward its final desired shape. The metal flow subsequently exits through a flat faced die having an aperture featuring the desired cross sectional profile. In the particular case of a lithium metal anode, the profile is a thin and substantially rectangular one. Because of the requirement that the cylindrical ingot which enters the flow die must exit the latter as a thin film of substantially rectangular shape, manufacturers have to date been limited to produce lithium metal films of a width which does not exceed the diameter of the ingot itself. The size of the anodes so produced are therefore limited to the diameter of commercially available ingots.

The extrusion process of a lithium/lithium alloy ingot as described above must also be performed under vacuum since lithium is highly reactive, and it therefore easily oxidizes when exposed to the atmosphere. This is especially the case when it is heated and under pressure. The process of pushing the ingot along the walls of the cylinder chamber under high pressure generates sufficient heat for the lithium to react with ambient nitrogen and form nitrides (i.e., $6Li+N_2 \rightarrow 2Li_3N$) so that the process must be performed under vacuum. However, when the ingot has been almost completely extruded and a new ingot must be placed inside the cylindrical chamber, the chamber is opened thereby allowing ambient air to enter the chamber and react with the hot lithium left along the chamber's walls. For that reason, the typical lithium extrusion process includes the step of thoroughly cleaning the walls of the cylindrical chamber prior to extruding a new ingot in order to remove all nitrides which remain thereon. Otherwise, traces of hard nitrides could block the die opening and cause a split in the extruded lithium/lithium alloy sheet, thereby rendering the sheet unusable for the production of EC cell components.

Furthermore, the length of the lithium/lithium alloy film that can be produced by the prior art extrusion process is limited by the amount of material contained in a single ingot. This is so due to the fact that when a new ingot is placed inside the chamber, the remaining portion of the previous ingot (2–5 mm) must be removed since it cannot flow perpendicular to the pressure. Thus, the conventional lithium extrusion process produces a finite length of extruded lithium/lithium alloy sheet per ingot.

Considering this background, it clearly appears that there is a need for a process and apparatus adapted to produce a thin sheet or film of lithium/lithium alloy that alleviates the limitations imposed by the size and length of commercially available lithium/lithium alloy ingots.

STATEMENT OF THE INVENTION

It is therefore an object of the present invention to provide a method of extruding a lithium/lithium alloy ingot into a thin sheet or film of a width not limited by the diameter of the ingot.

It is another object of the present invention to provide a method of extruding lithium or lithium alloy into a thin sheet or film in a semi-continuous process.

It is a further object of the present invention to provide a lithium/lithium alloy thin sheet film obtained from an extrusion process having a width exceeding the diameter of the original lithium/lithium alloy ingot.

As embodied and broadly described, the invention provides a method of extruding lithium or lithium alloy to form a thin sheet, the method comprising the steps of:

provide an ingot of lithium metal or lithium alloy having a length and a diameter;

pressing the ingot through a flow channel comprising an entrance having a first height and a first width, an exit having a second height and a second width and a passage joining the entrance and the exit, the second width being larger than the first width such that the lithium metal or lithium alloy exits the flow channel with a overall width exceeding the diameter of the ingot; and thereafter, extruding the lithium metal or lithium alloy through an extrusion die aperture in the form of a thin sheet.

In a preferred embodiment, the extrusion die aperture is adjustable such that the height of a central portion of the die aperture may exceed the height of both extremities of the die aperture.

As embodied and broadly described, the invention also provides a method of extruding lithium or lithium alloy ingots to form a thin sheet, through an extrusion apparatus comprising an inner chamber, a piston head at one end of said inner chamber and a flow die and extrusion die assembly at a second end of said chamber; the method comprising the steps of:

inserting a first ingot of lithium metal or lithium alloy into the inner chamber;

creating partial vacuum inside the inner chamber, the partial vacuum extending in front and behind the piston head;

pressing the first ingot with the piston head through the flow die and extrusion die assembly;

when the first ingot is partially extruded, retrieving the piston head while maintaining partial vacuum throughout the inner chamber;

when the piston head is retrieved, opening a rear door of the extrusion apparatus and inserting a second ingot of lithium metal or lithium alloy into the inner chamber such that one end of the second ingot abuts one end of the first ingot;

pressing the second ingot with the piston head onto the first ingot such that abutting ends of the first and second ingots fuse together under the pressure applied by the piston head and a continuous length of thin sheet of lithium or lithium alloy is extruded from more that one ingot.

Advantageously, the piston head comprises a smooth substantially flat surface such that when the piston head presses against the rear surface of the ingot, the rear surface of the ingot remains substantially smooth and flat thereby allowing fusion of the abutting ingots without voids. In a further embodiment, an adapter plate having a smooth substantially flat surface is positioned at the front of the piston head allowing a standard piston head to be adapted to the process.

As embodied and broadly described, the invention further provides an electrochemical cell comprising a thin lithium metal anode sheet, a cathode and an electrolyte separator between the anode and the cathode, the thin lithium metal anode sheet obtained by an extrusion process of a lithium or lithium alloy ingot having a length and a diameter, the thin lithium metal anode sheet having a width exceeding the diameter of the lithium or lithium alloy ingot.

As embodied and broadly described, the invention also provides a die assembly for use in extruding lithium or lithium alloy ingots into a thin sheet, said die assembly comprising a die holder and an extrusion die having an adjustable die aperture, said die holder having adjustment means for adjusting said die aperture.

Advantageously, the extrusion die comprises an upper plate secured to a lower plate together defining the extrusion die aperture, the upper plate and the lower plate comprising adjustment means for adjusting a curvature of the upper plate and lower plate, the die holder adjustment means being connected to the upper plate and the lower plate adjustment means when the extrusion die is positioned in the die holder such that an operator may adjust the die aperture while extruding lithium or lithium alloy ingots.

BRIEF DESCRIPTION OF THE DRAWINGS

A detailed description of examples of implementation of the present invention is provided hereinbelow with reference to the following drawings, in which:

FIG. 2 is a schematic enlarged cross-sectional view of a flow die as shown in FIG. 1;

FIG. 2a is a schematic top plan view of the channel of the flow die shown in FIG. 2;

FIG. 2b is a plan view of the entrance of the channel of the flow die shown in FIG. 2;

FIG. 2c is a plan view of the exit of the channel of the flow die shown in FIG. 2;

FIG. 6a is a perspective view of a die assembly in accordance with a variant; and FIG. 6b is a perspective exploded view of the die assembly shown in FIG. 6a.

Figure 1:
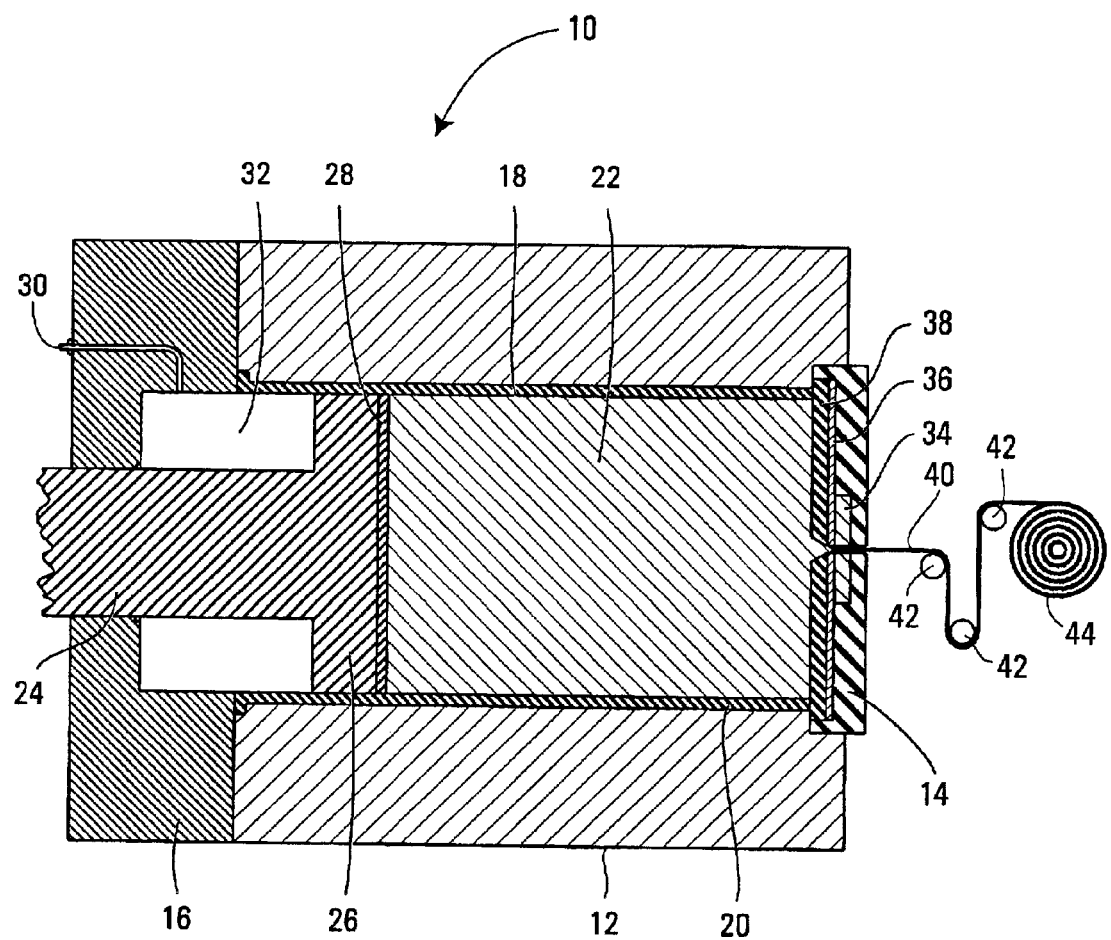
FIG. 1 is a schematic side cross-sectional drawing of an apparatus for forming a lithium/lithium alloy extrusion into a thin sheet in accordance with one embodiment of the invention, the figure also showing the metal flow during the extrusion process.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF THE DRAWINGS

With reference to FIG. 1, there is shown an apparatus 10 for extruding solid lithium or alloys thereof. The apparatus 10 comprises a main structural body 12 having a front door 14 and a rear door 16 all made of thick cast iron which is adapted to withstand the high pressures that are generated within the extrusion apparatus 10. The structural body 12 as well as the front and rear doors 14 and 16 together define a cylindrical inner chamber 18. Inner chamber 18 comprises a 4140 steel sleeve 20 adapted to receive and accommodate a commercially available lithium/lithium alloy ingot 22. sleeve 20 may be removed from the structural body 12 for cleaning and general maintenance. The rear door 16 accommodates therethrough a piston 24 having a piston head 26 which is adapted to reciprocate within inner chamber 18 and apply pressure to the ingot 22. The piston head 26 comprises a front adapter plate 28 having a smooth flat surface to apply an even pressure onto the ingot such that the rear surface of the ingot 22 remains perfectly smooth when piston 24 presses onto it during the extrusion process. The rear door 16 further comprises a vacuum conduit 30 connected at one end to a vacuum pump (not shown) and at the other end to the rear portion 32 of inner chamber 18 such that the extrusion process is carried out under vacuum and the entire inner chamber 18 is under vacuum, including the rear portion 32 located behind piston head 26. The front door 14 comprises an inner housing adapted to receive an extrusion die 34, a separator plate 36, and a flow die 38 assembly through which the ingot 22 is extruded into a thin sheet 40. The extruded thin sheet 40 is pulled and rolled under a predetermined tension by and through a series of cylindrical rollers 42, as is well known in the art, and finally wound onto a roll 44 for subsequent storage or further processing.

Referring to FIGS. 1 to 2b, the extrusion process in accordance with the invention is carried out as detailed hereinafter. Firstly, a commercially available pure lithium ingot 22 or alloy thereof having a typical length of 10, 15 or 30 inches and a typical diameter of 8 inches is inserted through the opened rear door 16 into the inner chamber 18. Rear door 16 is then closed. A vacuum pump connected to the vacuum conduit 30 is subsequently activated to create a partial vacuum inside inner chamber 18 in front and behind of piston head 26. When a predetermined vacuum is established inside inner chamber 18, piston 24 is activated. Piston 24 applies a high pressure P to the rear surface of ingot 22 forcing the lithium metal/lithium metal alloy through flow die 38 (as illustrated by the series of arrows in FIG. 2), through separator plate 36 which defines the final width of the thin lithium alloy sheet 40, and finally through extrusion die 34. Pressure P typically varies between 100 and 500 tons depending on the modulus of elasticity of the lithium alloy; the latter being proportional to the percentage of aluminum in the lithium alloy. The percentage of aluminum in the alloy increases the minimum pressure necessary for extrusion of the ingot. The lithium/lithium alloy flows though a channel of flow die 38 having an 8-inch entrance and a 9 to 10 inch exit such that the width of the exiting lithium exceeds the diameter of the initial ingot 22. A thin sheet 40 of lithium/lithium alloy having a thickness of 150 microns to 300 microns emerges from the extrusion die 34. As indicated previously, the thin lithium/lithium alloy sheet 40 is then pulled and rolled under a predetermined tension by cylindrical rollers 42 and wound onto a roll 44 for storage or to be brought to a further processing station.

When a substantial portion of ingot 22 is extruded such that a few inches of the initial ingot's length are left, piston 24 is pulled back while the vacuum is still maintained throughout inner chamber 18. As piston 24 is pulled back, the cylindrical sleeve 20, as well as any traces of lithium left thereon, are allowed to sufficiently cool down such that the traces of lithium/lithium alloy will not react with the ambient air when rear door 16 is opened. When piston 24 is fully retrieved within a recess of rear door 16, the latter is opened and a new ingot is inserted into inner chamber 18; the front portion of the new ingot abutting against the rear surface of the remaining ingot 22. Since piston head 26 is provided with a front adapter plate 28 having a smooth flat surface, the rear surface of the remaining ingot 22 is also smooth. As a result, when the front face of the new ingot abuts the rear surface of the remaining ingot 22, there are no voids therebetween. The rear door 16 is then closed behind the new ingot, the vacuum pump is activated to re-establish the partial vacuum inside inner chamber 18 in front and behind piston head 26. When the predetermined vacuum is reached, piston 24 then applies pressure onto the rear surface of the new ingot. Since pure solid lithium or solid lithium having a small percentage of alloy metals are so ductile, when the front face of the new ingot is pressed against the rear face of the remaining ingot, the two ingots fuse together via the action of the high pressure applied by piston 24; the resulting lithium sheet 40 formed thereby may be extruded almost continuously (more precisely, the process is semi-continuous). Since some time is required to properly fuse the two ingots, the remaining few inches of the first ingot provide enough margin to ensure that the two ingots will be fused when the abutting sections of the fused ingots reach the extrusion die 34.

The semi-continuous extrusion process described above has two distinct advantages over the prior art methods. Firstly, it eliminates the wasted lithium/lithium alloy that usually occurs in conventional extrusion processes. When an ingot is nearly completely extruded in a conventional process, the remaining portion or left over portion of the ingot left against the extrusion die (which usually has a length of a few millimeters) must be discarded prior to inserting a new ingot. Secondly, in conventional lithium extrusion processes, the partial vacuum is lost when front door 14 is opened. When piston 24 is pulled back, the traces of lithium left on the walls of sleeve 20 react with the ambient air to form nitrides. The sleeve 20 must therefore be thoroughly cleaned or replaced with a new sleeve 20 prior to extruding a new ingot. Otherwise, traces of nitrides could be found in the extruded sheet, which would be unacceptable. Conventional lithium extrusion processes can only extrude lithium/lithium alloys in batches and cannot extrude an entire ingot, as there is always an unused portion of the ingot (1 to 3 mm) left in the inner chamber when a new ingot must be inserted in the extruder. The semi-continuous lithium/lithium alloy extrusion process according to the invention enables the extrusion of the entire length of the ingot and also ensures that no traces of nitrides will block the extrusion die 34 and slice the extruded sheet since a vacuum is maintained in front and behind piston head 26 throughout the entire stroke of piston 24 and the traces of lithium left along the wall of sleeve 20 are allowed to cool down prior to opening rear door 16 thereby preventing the formation of nitrides harmful to the extrusion process.

Referring now more specifically to FIGS. 2, 2a, 2b and 2c which illustrate flow die 38 and more specifically the flow die channel 50 through which the lithium metal/lithium alloy metal flows and is funneled towards extrusion die 34. As shown, flow die channel 50 comprises an entrance 52, an exit 54, an upper wall 56, a lower wall 58, and a pair of side walls 60 and 62 which together define a passage for the flow of lithium/lithium alloy metal. In this particular design, lower wall 58 is a mirror image of upper wall 56. The central portion 64 of entrance 52 is about 0.3 to 0.5 inches in height and the full width of entrance 52 is about 8 inches when extruding an ingot of 8-inch diameter. The central portion 66 of exit 54 is about 0.1 to 0.2 inches in height and the full width of exit 54 is about 9 to 10 inches when extruding an ingot of 8-inch diameter. As shown in FIGS. 2a, 2b and 2c, the side portions 68 and 70 of channel 50 have larger cross-sectional areas than the central portions 64 and 66 respectively and are designed to generate a substantially outward flow of metal away from the central portions 64 and 66 and toward side walls 60 and 62 in order to expand the width of the resulting sheet 40 such that the width of the latter exceeds the diameter of the initial ingot 22. The flow of metal is guided outwardly along the sidewalls 60 and 62 by the increased cross-sectional areas of side portions 68 and 70, which are angled outwardly. Side portions 68 and 70 further comprise sub-channels 72 and 74 running along side walls 60 and 62 which are adapted to further generate increased metal flow along side walls 60 and 62. The ductility of lithium metal or alloys thereof is advantageously exploited by channel 50 to guide the metal flow outwardly to obtain a sheet having a width exceeding that of the ingot's initial diameter.

Figure 3:
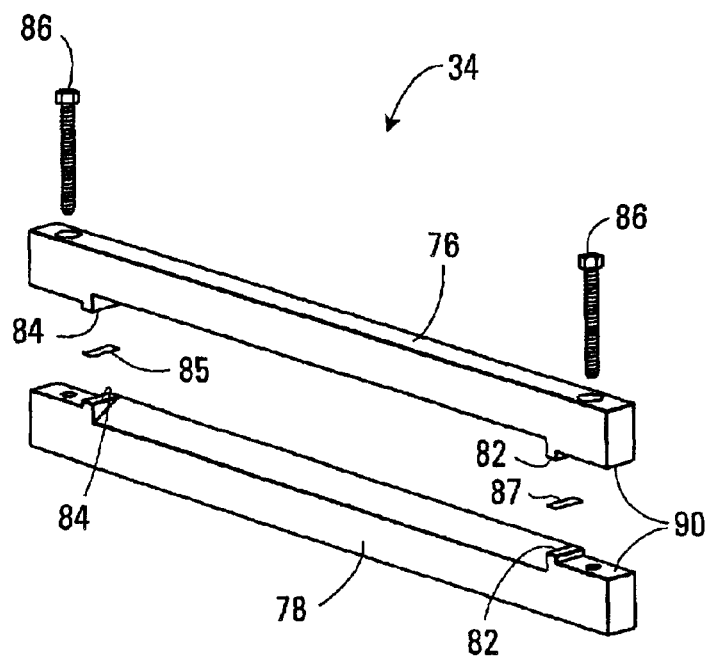
FIG. 3 is a rear exploded perspective view of an extrusion die as shown in FIG. 1.
Figure 4:
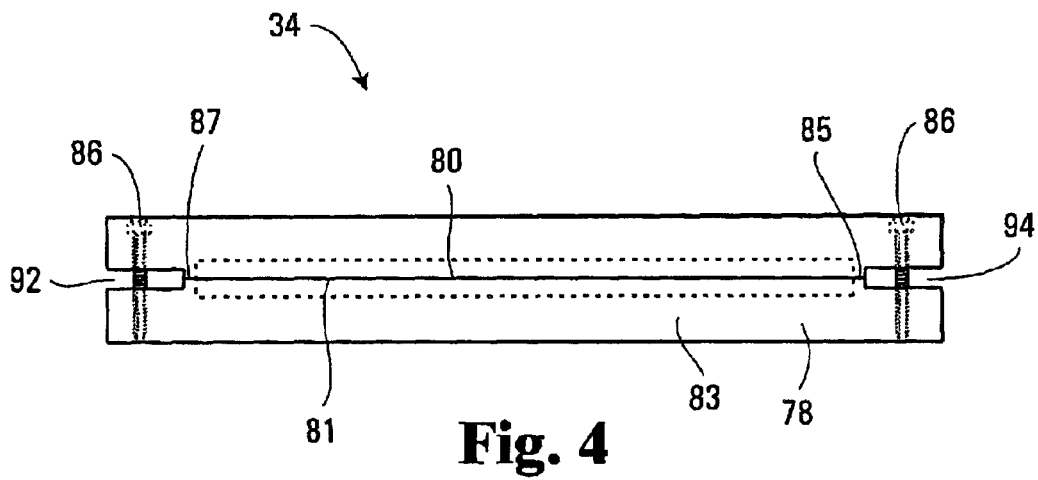
FIG. 4 is a front elevational view of the extrusion die shown in FIG. 3, the extrusion die being assembled.
Figure 5:
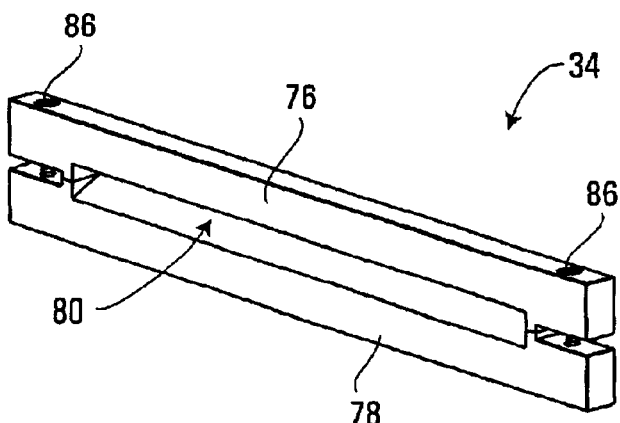
FIG. 5 is a rear perspective view of the extrusion die shown in FIG. 4.

The lithium/lithium alloy metal exits flow die 38 with a profile which corresponds to that of exit 54, shown in detail in FIG. 2c. The lithium/lithium alloy metal then flows through a flat face extrusion die 34 as illustrated in FIGS. 3 to 5 where its profile is further reduced to that of a thin sheet. As shown in FIG. 1, the flat face 83 of the flat face extrusion die 34 is facing the oncoming flow of metal.

Extrusion die 34 comprises an upper plate 76 and a lower plate 78 together defining a die opening 80 in the form of a thin substantially linear aperture of about 10 thousandths of an inch (or roughly about 250 microns) in height and of about 9 to 10 inches in width. Upper plate 76 and lower plate 78 are machined from tungsten carbide and comprise a pair of flat surfaces 82 and 84 located adjacent to die opening 80, and upon which plates 76 and 78 rest against one another. Die opening 80 is defined by inserting between flat surfaces 82 and 84 a pair of calibrated shims 85 and 87 of the precise thickness of the lithium/lithium alloy sheet to be extruded. With a selected pair of shims 85 and 87 installed, lips 81 form a thin die opening 80 of a desired dimension corresponding to the thickness of the extruded lithium/lithium alloy sheet. Each plate 76 and 78 further comprises insteps 88 and 90 respectively located on the far side of each flat surface 84 and 82. As shown in FIG. 4, when upper plate 76 and lower plate 78 are assembled, insteps 88 and 90 define gaps 92 and 94 adjacent each calibrated shim 85 and 87. A pair of threaded fasteners 86 extends through each gap 92 and 94 and acts to primarily secure upper plate 76 to lower plate 78 but also to provide adjustment means of the curvature of the lips 81 to adjust the shape of die opening 80. When threaded fasteners 86 are tightened beyond a predetermined torque, fasteners 86 close gaps 92 and 94 thereby leveraging the entire length of plates 76 and 78 on calibrated shims 85 and 87 with the effect of marginally bending the entire length of lips 81 such that die opening 80 becomes eye-shaped with its center portion marginally more opened than its sides. The adjustment of the torque of threaded fasteners 86 enables to fine tune the final shape of the extruded lithium/lithium alloy thin sheet 40.

In the extrusion process of very thin lithium/lithium alloy sheets as described herein, the central portion of the extruded thin sheet may be marginally thinner than its edge portions due to pressure variations along the length of die opening 80. The adjustment of threaded fasteners 86 provides means for adjusting the thickness of the central portion of the lithium/lithium alloy sheet 40 such that it is at least equal to that of its edge portions. Although FIGS. 3 to 5 depict adjusting means in the form of threaded fasteners 86, it should be expressly understood that any other type of adjusting means such as cam mechanisms, gear mechanisms, wedges, etc. remains within the scope of the present invention. Moreover, any number of threaded fasteners, alternative adjusting means, or combinations thereof can also be used for a single extrusion die.

In practice it is sometimes advantageous to extrude a thin sheet having a central portion marginally thicker than its edge portion. Such is the case, for example, when an extruded lithium/lithium alloy sheet having a thickness of roughly 250 microns is further processed by lamination, rolling or calendaring in order to reduce its final thickness to less than 100 microns and more preferably less than 50 microns. If the extruded lithium/lithium alloy sheet features a marginally thicker central portion, the pressure rollers used in the thickness reduction operations will therefore always be in contact with at least the central portion of the sheet and may work the latter to an even thickness without creating sunken areas.

Although the process and apparatus (i.e., extrusion die and the like) described and depicted herein are designed for the extrusion of a cylindrical ingot having an initial diameter of approximately 8 inches, it should be understood that the present invention also contemplates the extrusion of ingots of any other dimension and shape. Moreover, the process and apparatus disclosed herein have been described in connection with an ingot composed of lithium or an alloy thereof. It should be expressly understood, however, that the use of alternative materials which are suitable for use as anode components and which exhibit the desired properties (e.g., ductility and the like) remains within the scope of the present invention.

As illustrated in FIGS. 6a and 6b, in a variant, the extrusion apparatus can further comprise a die holder 100 adapted to receive, support and align extrusion die 34, separator plate 36, and flow die 38. Die holder 100 comprises a first recessed portion 102 adapted to house extrusion die 34 and a second recessed portion 104 adapted to house separator plate 36 and flow die 38. Separator plate 36 and flow die 38 are preferably aligned with extrusion die 34 using guide pins 107 such that flow channel 50, separator plate opening 106 and extrusion die opening 80 are in alignment to provide reproducibility of process. Flow die 38 is secured to die holder 100 with a series of fasteners 108. Die holder 100 is further provided with a set of adjustment channels 110 and 112. Channels 110 are located on either side of die holder 100 (although only one is shown in the Figures) and give access to the threaded fasteners 86 of extrusion die 34 such that the curvature of die opening 80 may be adjusted when extrusion die 34 is installed in die holder 100. Channels 112 are located in the central portion of die holder 100 and give access to one or more threaded fasteners positioned along the length of extrusion die 34 to provide fine tuning of die opening 80. In one embodiment, there is provided a single adjustment fastener 115 located in the middle of die opening 80 to provide a means of adjusting the central portion of die opening 80. In a second embodiment (as shown) three adjustment fasteners 114 and 115 are positioned along the length of die opening 80 to provide means of adjusting the side portions and the central portion of die opening 80. Any number of adjustment fasteners, however, may be used without departing from the spirit of the invention. Advantageously, either the front door 14 onto which die holder 100 is mounted or the structural body 12 of extrusion apparatus 10 are provided with means of reaching the adjustment fasteners 86, 114 and 115 when die holder 100 is positioned inside extrusion apparatus 10 such that adjustment and fine tuning of die opening 80 may be carried out during the extrusion process. As shown in the embodiment of FIGS. 6a and 6b, die holder 100 can, for example, be mounted onto a flat front door 118 with fasteners 119 and the structural body 12 of extrusion apparatus 10 is provided with a series of apertures aligned with channels 110 and 112 of die holder 100 when front door 118 is closed. In another embodiment not shown, die holder 100 can be mounted into a recess of front door 118 and a series of apertures aligned with channels 110 and 112 are provided in door 118 to reach the adjustment fasteners and allow adjustment and fine tuning of die opening 80 during the extrusion process. Other means of adjusting and fine tuning die opening 80 during the extrusion process are also contemplated without departing from the invention. For example, long fasteners may be used to avoid the need of using long tools to access fasteners 86, 114 and 115. As well, various extensions may be built into front door 118 or the structural body 12 of extrusion apparatus 10 that engage the various adjustment fasteners when die holder 100 is installed. Furthermore, die holder 100 may be provided with built-in adjustment means, which mate with various extensions built into front door 118 or the structural body 12 of extrusion apparatus 10. Various other embodiments and configurations are contemplated to allow adjustment and fine tuning of die opening 80 during the extrusion process.

Although the present invention has been described in relation to particular variations thereof, other variation and modifications are contemplated and are within the scope of the present invention. Therefore the present invention is not to be limited by the above description but is defined by the appended claims.

We claim:

1. A method of extruding lithium or lithium alloy to form a thin sheet, the method comprising the steps of:

providing an ingot of lithium metal or lithium alloy having an initial length and diameter;

pressing said ingot through a flow channel comprising an entrance having a first height and a first width, an exit having a second height and a second width, and a passage joining said entrance and said exit, said second width of said exit being wider than said first width of said entrance such that said lithium metal or lithium alloy exits said flow channel with a width exceeding the initial diameter of said ingot, said passage including a top wall, a bottom wall, and a pair of side walls connecting said top wall and said bottom wall, said passage defining a pair of subchannels, each subchannel running generally along a respective side wall of said passage and having a cross-sectional area adapted to:

generate an outward flow of said lithium metal or lithium alloy away from a central portion of said passage and towards said respective side wall; and guide said lithium metal or lithium alloy generally along said respective side wall; and thereafter, extruding said lithium metal or lithium alloy through an extrusion die aperture in the form of a thin sheet.

2. A method as defined in claim 1 wherein said first height exceeds said second height.

3. A method as defined in claim 1 wherein prior to pressing said ingot through said flow channel, said ingot is placed into a chamber comprising a piston having a piston head at a first end of said chamber, said flow channel being located at a second end of said chamber, the method further including the step of generating a vacuum within said chamber, the vacuum extending in front and behind said piston head.

4. A method as defined in claim 3 wherein, when a first lithium or lithium alloy ingot is partially extruded, said method includes the step of retrieving said piston head while maintaining partial vacuum throughout said chamber to avoid formation of nitrides; when said piston head is retrieved, said method includes the steps of opening a rear door enabling access to said chamber and inserting a second ingot of lithium metal or lithium alloy into said chamber such that one end of said second ingot abuts one end of said first ingot.

5. A method as defined in claim 4 wherein said second ingot is introduced into said chamber behind said first ingot and said second ingot is pressed against a rear surface of said first ingot, said first and second ingots fusing together under a pressure applied by said piston such that said thin sheet comprises lithium or lithium alloy from said first ingot and said second ingot.

6. A method as defined in claim 3 wherein a front portion of said piston head comprises a smooth substantially flat surface such that when said piston head presses against a rear surface of said ingot, said rear surface of said ingot remains substantially smooth and flat.

7. A method as defined in claim 3 wherein said piston head comprises an adapter plate positioned at a front of said piston head, said adapter plate having a smooth substantially flat surface such that when said piston head presses against a rear surface of said ingot, said rear surface of said ingot remains substantially smooth and flat.

8. A method as defined in claim 1 wherein said extrusion die aperture is defined by an upper plate secured to a lower plate, said upper plate and said lower plate comprising adjustment means for adjusting a curvature of each of said upper plate and said lower plate, said adjustment means adapted to be actuated while said thin sheet of lithium or lithium alloy is being extruded thereby adjusting a profile of said extrusion die aperture.

* * * * *